(No Model.)

J. W. GOTTSCHALK & S. P. SIPE.
DEVICE FOR SECURING SMALL WHEELS ON SHAFTS.

No. 539,260. Patented May 14, 1895.

Witnesses.

Inventors

Attorney.

United States Patent Office.

JOHN W. GOTTSCHALK AND SAMUEL P. SIPE, OF PHILADELPHIA, PENNSYLVANIA.

DEVICE FOR SECURING SMALL WHEELS ON SHAFTS.

SPECIFICATION forming part of Letters Patent No. 539,260, dated May 14, 1895.

Application filed February 12, 1895. Serial No. 538,084. (No model.)

*To all whom it may concern:*

Be it known that we, JOHN W. GOTTSCHALK and SAMUEL P. SIPE, citizens of the United States, residing at Philadelphia, in the county of Philadelphia and State of Pennsylvania, have invented certain new and useful Improvements in Wheel-Fastening Devices; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to a device for removably securing small wheels to their driving shafts in place of the set screw ordinarily used, and it is particularly adapted for use on machines where it is necessary to frequently change the gear wheels for the purpose of varying the speed of some parts of the machine.

The improvement is composed of two hinged arms or clamps having secured thereto a straight pin that is adapted to pass through a hole in the hub of the wheel and project some distance into a corresponding hole formed in the driving shaft, thus securely holding the wheel on the shaft and preventing any turning.

Figure 1:
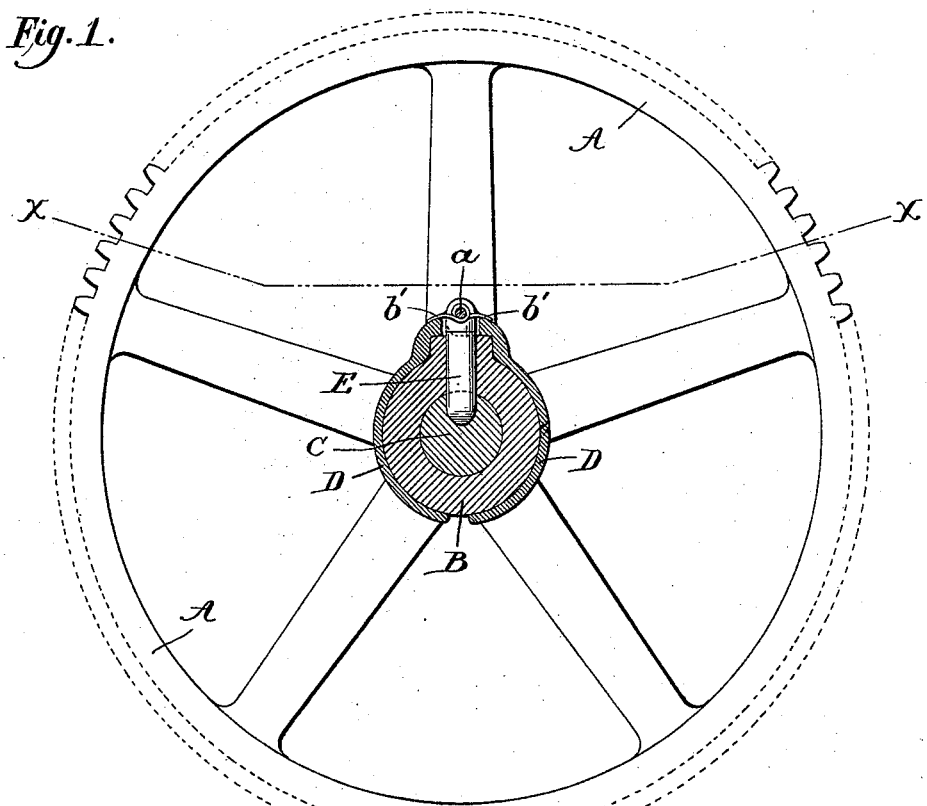
Figure 2:
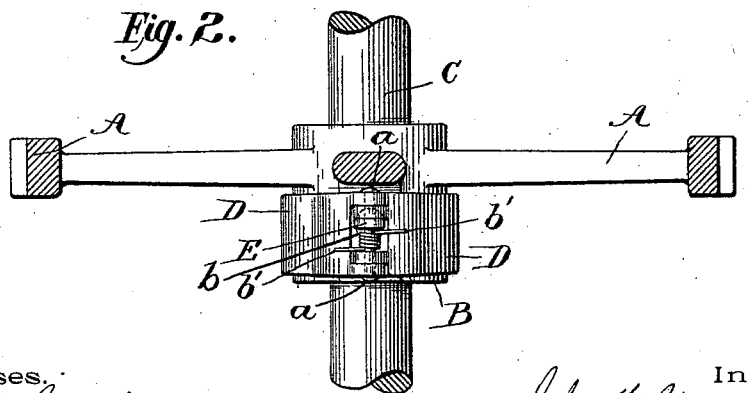

In the accompanying drawings, Figure 1 is a view in perspective of a cog-wheel secured on a shaft by means of our improvement and a vertical sectional view through the projecting hub of the wheel and the surrounding clamp. Fig. 2 is a plan view of the wheel and clamp on line X X of Fig. 1, the top section of the cog-wheel being removed.

A, represents a cog wheel of the ordinary construction.

B, is the projecting hub of the wheel.

C, is the driving shaft.

D, D, are two arms hinged or jointed together and clamping around the hub B.

*a*, is a stout wire pin connecting the clamping arms D, D, together.

E, is a steady pin or bolt secured between the arms D, D, by the pin *a*, passing through a hole in the upper end thereof.

This pin E, passes through a hole in the hub B, and projects into a corresponding hole in the shaft C.

*b*, is a spiral spring surrounding the pin *a*, and having its free ends *b'*, *b'*, bearing on the clamping arms D, D, thus holding them in position around the hub of the wheel and preventing the pin E, from dropping out as the wheels turn around.

The steady pin E, should be made of a size to fit snugly into the hole in the hub B, and the driving shaft C; and the spring in the clamping arms D, D, should be strong enough to hold the several parts in position. When desiring to remove the gear wheel A, from the shaft C, the arms D, D, are spread so as to allow them to pass over the hub. The pin E, can then be easily pulled out, leaving the wheel free.

Having thus described our invention, what we claim as new, and desire to secure by Letters Patent of the United States, is—

1. The herein described device for removably securing wheels on their driving shafts, consisting of the clamping arms D, D, and a spring hinge joining said arms and having connected thereto the steady pin or bolt E, adapted to pass through the hub of the wheel and project into the driving shaft, as set forth.

2. In combination with a gear wheel or pulley provided with a projecting hub, of the clamping arms D, D, the hinge joining said arms together and the steady pin or bolt E, the said steady pin or bolt E, adapted to pass through the projecting hub and into the driving shaft upon which the wheel is mounted, being held in position by the said clamping arms D, D, as set forth.

3. A device for removably securing wheels on their shafts consisting of the arms D, D, hinged together and provided with a bolt or steady pin E, adapted to pass through an opening in the hub and project into the shaft, and suitable means for holding said arms to the hub, substantially as set forth.

In testimony whereof we affix our signatures in presence of two witnesses.

JOHN W. GOTTSCHALK.
SAMUEL P. SIPE.

Witnesses:
SAML. H. KIRKPATRICK,
THOS. D. MOWLDS.